June 5, 1951 B. E. DENTON 2,555,832

CATHODE-RAY DEFLECTION SYSTEM

Filed Oct. 29, 1949 2 Sheets-Sheet 1

INVENTOR
BETHEL E. DENTON
BY
[signature]
ATTORNEY

June 5, 1951 B. E. DENTON 2,555,832

CATHODE-RAY DEFLECTION SYSTEM

Filed Oct. 29, 1949 2 Sheets-Sheet 2

INVENTOR
BETHEL E. DENTON
BY
O. Lin [signature]
ATTORNEY

Patented June 5, 1951 2,555,832

UNITED STATES PATENT OFFICE 2,555,832

CATHODE RAY DEFLECTION SYSTEM

Bethel E. Denton, Merchantville, N. J., assignor to Radio Corporation of America, a corporation of Delaware Application October 29, 1949, Serial No. 124,380

17 Claims. (Cl. 315—27)

Figure 1:
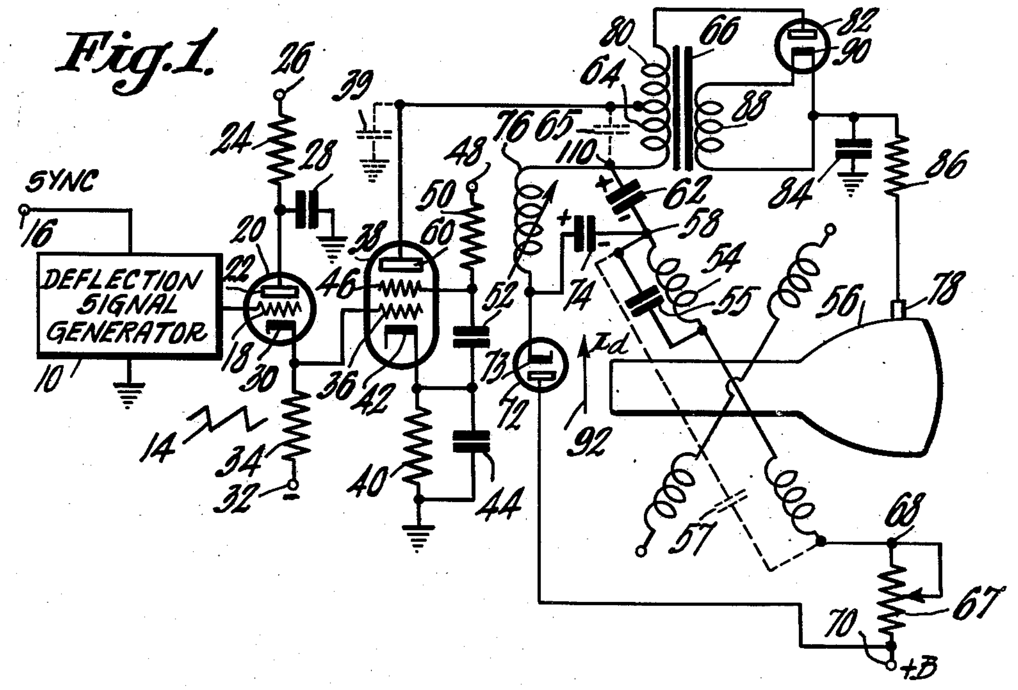

The present invention relates to deflection circuits for cathode ray tubes and deals more particularly, although not necessarily exclusively, with an improved form of amplitude control arrangement whereby the amplitude of electromagnetic cathode ray beam deflection may be controlled without deleteriously effecting the deflection yoke current waveform producing the deflection.

In one of its more specific forms, the present invention is involved with a novel form of width control for television receivers employing a combination, kinescope high voltage and deflection current generator such that a substantial range of amplitude variation is offered by the width control without greatly affecting the generated high voltage or the contour of the deflection current producing the beam deflection. The present invention further finds particular application to television receiver electromagnetic deflection circuits of the direct-drive variety.

In that branch of the electrical art dealing with the electromagnetic deflection of cathode ray beams, considerable attention has been drawn to the need of providing a simple but effective method and circuit arrangement for varying the amplitude of the beam deflection without incurring excessive circuit losses and impairing the character of beam deflection by imposing distortion on the deflection current waveform.

Particularly is such an amplitude control of value in present-day deflection circuits used in television receivers. Although the needed range of amplitude control in television receivers is not excessive, some control must be provided to take care of unavoidable changes in circuit operation. Moreover, the means employed for controlling the amplitude of beam deflection must act in such a way as to cause a minimum of distortion in the required linear sawtooth deflection of the cathode ray beam. Even further, in television receiver electromagnetic deflection systems which devolop cathode ray beam accelerating potential by means of deflection "kickback" rectification, it is important that the action of the width control arrangement have a minimum influence over the developed beam accelerating potential. Otherwise, changes in the width of the television raster would demand annoysome refocussing of the cathode ray electron beam to maintain optimum picture sharpness and clarity.

In television receiver electromagnetic deflection systems utilizing an output transformer perhaps the most popular form of width control arrangement is found in the shunting of a portion of the output transformer winding by a variable inductance or capacitance. The effect of the variable inductance is of course to change the effective turns ratio of the output transformer and thus the amplitude of signal applied to the electromagnetic deflection yoke connected with the transformer. The use of a variable capacitance has a similar effect, also acting to control the return time or free resonance frequency of the transformer and thereby the effective width of the television picture described in the scanning raster. The principles involved in these types of width control have more recently found limited application in direct-drive type of deflection circuits where no output transformer per se is utilized but the deflection yoke is connected in series with an autotransformer in the anode-cathode circuit of the deflection output tube. Here the variable inductance or variable capacitance width control may be placed across a section of the autotransformer winding.

However, the variable inductance or variable capacitance width controls do represent additional cost in deflection circuit construction and could the inductance or capacitance units be replaced by more economical resistive elements, considerable additional simplicity in circuit fabrication, as well as cost saving, could be realized. Notwithstanding the evident simplicity of resistive elements for deflection circuit width control, prior art attempts to utilize resistive width controls have not been entirely satisfactory, the width control itself either imposing an intolerable circuit loss in the deflection system or producing an undesirable amount of distortion in the developed deflection waveform.

Moreover, the deflection circuits of the type described in a copending U. S. patent application by Simeon I. Tourshou, Serial No. 90,612, filed April 30, 1949, entitled "Television Deflection Power Recovery Circuits," where neither a deflection output transformer nor autotransformer is used, but the deflection yoke is connected directly in the output circuit of the discharge tube, little or no opportunity is presented for the use of an inductive or capacitive type width control having sufficient control range. In this latter direct-drive type of deflection circuit, which is further provided with a novel means for developing a cathode ray beam accelerating potential, excessive care must be exercised to insure that any width control arrangement does not upset the necessary delicate circuit balance and thereby deleteriously influence the value of beam accelerating potential, as well as the waveform of the deflection current.

It is therefore a purpose of the present invention to provide an improved method and apparatus for amplitude control of the deflection produced in electromagnetic deflection systems.

It is moreover an object of the present invention to provide a simple, economical and novel width control arrangement for television receiver deflection systems such that a minimum alteration in waveform is incurred through the exercise of the entire range of the width control.

A still further object of the present invention resides in the provision of an improved width control arrangement for electromagnetic deflection systems which allows the use of a variable resistive element as a width control without producing excessive deflection current distortion or imposing intolerable circuit losses.

The present invention further aims to provide a novel form of television receiver width control for use with direct-drive types of deflection circuits, particularly of the form described in a copending U. S. patent application by S. I. Tourshou, Serial No. 90,612, filed April 30, 1949, entitled "Television Deflection Power Recovery Circuits."

In the realization of the above objects, the present invention in one of its more general forms contemplates the use of a variable resistance to be placed in series with an electromagnetic deflection yoke at such a point in the deflection circuit that the conventional yoke damping circuit acts in shunt with the series combination of the yoke and resistance.

In one of its more specific forms as applied to direct-drive types of deflection circuits, for example, of the type described in the above-referenced U. S. patent application by Simeon I. Tourshou, the present invention contemplates the use of a variable resistance connected in series with the electromagnetic deflection yoke such that the yoke damping means not only acts in shunt with the yoke and resistance combination, but the voltage waveforms developed by the reaction scanning power recovery action of the circuit are altered in such a way as to compensate for undesirable changes in deflection waveform possibly produced through the influence of the series width control resistance.

Figure 2:
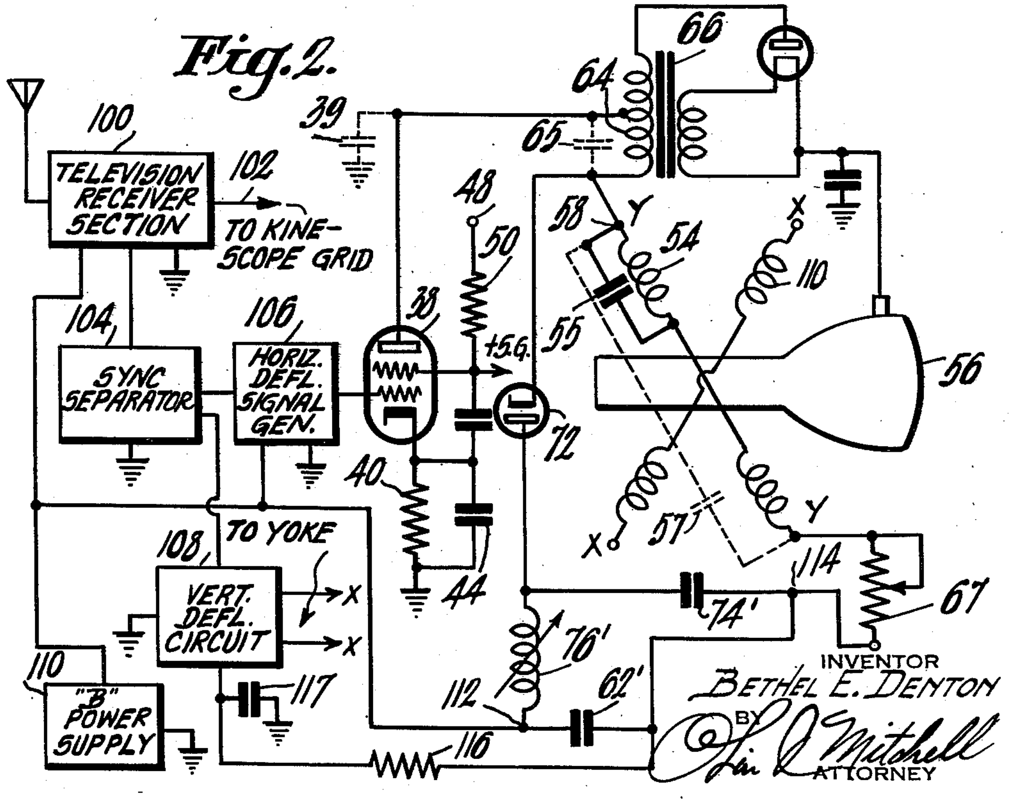
Figure 3:
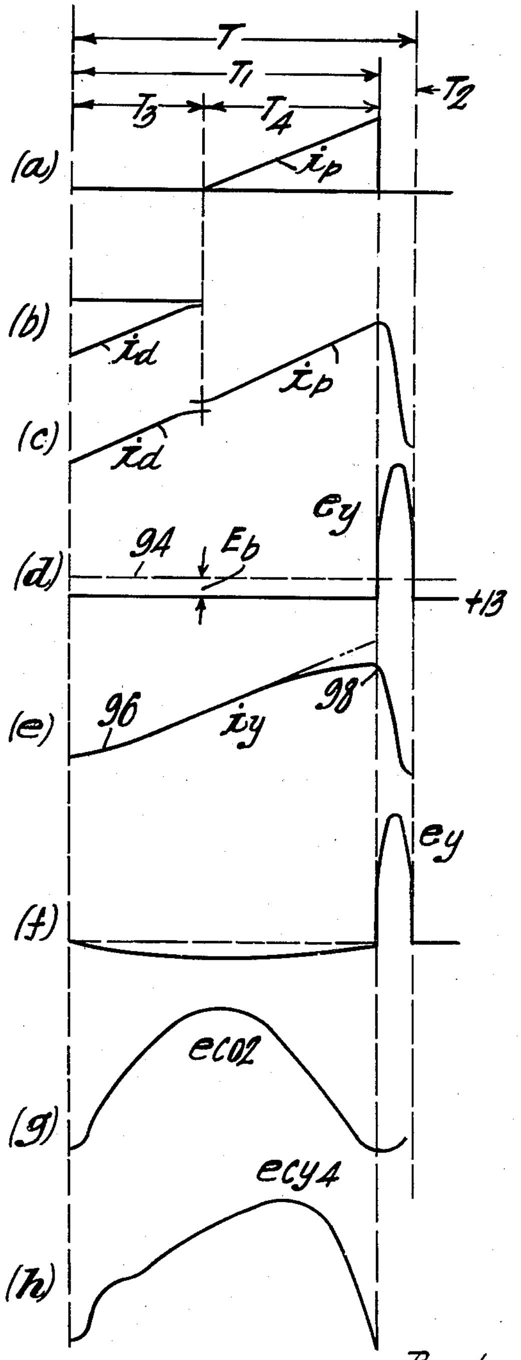

Other objects and features of advantage of the present invention, in addition to those set forth hereinabove, as well as a more complete understanding of its mode of operation, will appear to those skilled in the art from a perusal of the following specification especially when taken in connection with the accompanying drawings in which:

Figure 1 schematically illustrates one form of the present invention as applied to a television type cathode ray beam deflection system;

Figure 2 is a schematic representation of another form of the present invention as applied to a typical television receiver;

Figure 3 graphically illustrates certain waveform peculiar to the operation of the arrangements shown in Figure 1 and Figure 2.

In order to clearly understand the operating principles of the present invention as applied to electromagnetic deflection circuits in general, as well as its more particular and purely exemplary application to a direct-drive type of deflection system, attention will first be given to the overall operating principles and characteristics involved in the novel direct-drive deflection system described in the aforementioned copending U. S. patent application by S. I. Tourshou, Serial No. 90,612.

Accordingly, in Figure 1, there is shown a deflection circuit of the above-referenced Tourshou type utilizing a source 10 of sawtooth deflection signal having a waveform substantially as shown at 14. A synchronizing signal may be applied to the terminal 16 for synchronizing the developed sawtooth signal 14. The developed sawtooth signal is then applied to the control grid 18 of a cathode follower type amplifier stage employing discharge tube 20. The anode 22 of the discharge tube 20 receives a suitable positive bias through dropping resistor 24 connected with a source of positive potential 26, by-pass condenser 28 maintaining the anode 22 at substantially A. C. ground potential. Connected between the cathode 30 of the cathode follower amplifier and a source of negative biasing potential 32 is a cathode follower load resistor 34 whose upper end is directly coupled to the control grid 36 of the deflection output discharge tube 38. The resulting low impedance of the cathode follower circuit permits higher amplitude drive of the control grid 36 without encountering undesirable distortion due to grid current flow. A suitable cathode biasing resistor 40 is connected between the cathode 42 of discharge tube 38 and ground potential, by-pass capacitor 44 being provided to reduce degeneration in the cathode circuit. A screen grid 46 is connected with a source of positive potential 48 through a screen dropping resistor 50, which is in turn by-passed to the cathode by means of capacitor 52.

In order to achieve well-known "B" boost power recovery reaction scanning with the deflection yoke 54, oriented for deflection of the beam in the cathode ray beam 56, the upper terminal 58 of the deflection yoke 54 is connected with the driver tube anode 60 through "B" boost capacitor 62. This capacitor 62 is in turn connected with the primary 64 of the pulse step-up autotransformer 66. The lower terminal 68 of the deflection winding is then connected through resistance 67 with a source of positive potential 70 from which is supplied energy to the deflection circuit. A damping diode 72 is provided for damping the deflection yoke 54 and is connected in shunt therewith through capacitor 74 as well as through variable linearity control inductance 76 and capacitor 62.

The novel form of high voltage power supply for the accelerating anode 78 of the kinescope 56 is based upon the high voltage pulse step-up transformer 66 and is disclosed in more detail in another copending U. S. patent application by Simeon I. Tourshou et al., Serial No. 56,562, filed October 26, 1948, entitled "High Voltage Power Supply." As more fully described in the related specification, the deflection current for the yoke winding 54 must pass through the primary 64 of the autotransformer 66 and it therefore induces in the secondary 80 high voltage positive-going pulses corresponding in time to the retrace portion of the deflection cycle. These high voltage pulses are then rectified by the diode 82 to develop a high unidirectional potential across the storage capacitor 84. The voltage appearing thereacross is then applied through the filter resistor 86 to the accelerating terminal 78 of the cathode ray tube 56. The auxiliary winding 88 of the autotransformer 66 supplies heater power for the filament 90 of the high voltage rectifier 82.

The overall operation of the deflection circuit in Figure 1 may be best understood through reference to the curves of Figure 3. Here the deflection circuit can be seen to operate as a reaction type of scanning circuit, that is, the desired sawtooth of current through the deflection yoke 54 is comprised of two sections, namely, a first portion produced by anode current ($i_p$) of the driver tube 38 (shown in curve 3*a*) and a second portion provided by current ($i_d$) representing magnetic energy stored in the deflection yoke and damped by the damper tube 72. As is well known to those skilled in the art, in such a system the driver tube 38 is biased sufficiently beyond cutoff such that only the upper portion of the sawtooth 14 causes conduction in the anode circuit. With normal circuit operating efficiency, this conduction period $T_4$ represents a little more than half of the linear rise time $T_1$ of the current sawtooth having a period of T. In Figure 3*a*, at the end of the time $T_1$, which represents the positive peak of the driving sawtooth 14, the discharge tube 38 is rendered non-conductive by the downward vertical portion of the sawtooth. However, the energy represented by the current in the yoke 54 at that time causes the yoke circuit and its associated stray capacitance to begin free oscillation. After a half cycle of free oscillation, the upper end 58 of the deflection yoke 54 then starts to go negative with respect to the lower end of the deflection coil 68, which is connected to the positive power supply terminal 70. When this occurs, the damping diode 72 conducts and provides damping of the magnetic energy in the yoke and in so doing produces current in the direction of the arrow $i_d$ at 92. The direction of flow of this current $i_d$ as illustrated in Figure 3*b* is opposite to the current $i_p$ in Figure 3*a* so that the current flow curves $i_d$ and $i_p$ in Figures 3*a* and 3*b* will tend to merge as in Figure 3*c* to form a substantially linear sawtooth rise time $T_1$. Since this rise time represents a linear increase in current flow through the yoke 54, during the time $T_1$, it is evident that the voltage developed across the yoke terminals will be substantially equal to $$L\frac{di}{dt}$$

But, since during conduction of the damping diode 72, the cathode 73 thereof is held at positive B+ potential of terminal 70, the capacitor 62 in combination with capacitor 74 and inductance 76 will charge up to substantially the value of $$L\frac{di}{dt}$$

thereby making the loop voltage of the damped yoke circuit necessarily equal to zero. As indicated by the direction of current flow $i_d$, the capacitors 62 and 74 will charge up in such a direction to increase the effective plate potential applied to the driver tube 38 at the time of its next conduction period commencing shortly before the end of time $T_3$.

It is seen then that the positive potential developed across the capacitors 62 and 74 will represent a portion of magnetic energy stored in the yoke 54 at the end of the linear rise time $T_1$. As noted, the conduction of the damper diode 72 prevents the terminal 58 of the deflection yoke from going appreciably more negative with respect to ground than the positive "B" potential at terminal 70. The average "B" boost thereby represented by the stored energy on capacitors 62 and 74 may be illustrated by dashed line 94 in Figure 3*d*. Dashed line 94 is merely the A. C. axis of the yoke voltage $E_y$ which, as stated, cannot go appreciably more negative than +B. Thus, the average potential boost in the circuit will be represented by the voltage $E_b$ defined by dashed line 94 in Figure 3*d*.

According to the previous description, the sawtooth of current developed through the yoke 54 would be presumed to be substantially linear and except for the presence of the inductance 76 in Figure 1 would be substantially linear. However, as was shown in a U. S. Patent 2,440,418 issued to S. I. Tourshou on April 27, 1948, entitled "Cathode Ray Beam Deflecting Circuit," in television practice it is generally desirable to purposely distort the developed sawtooth current to compensate for the screen flatness of the cathode ray tube 56. The form of necessary distortion is illustrated in Figure 3*e*, which shows that the desired current waveform through the yoke is rounded at 96 and at 98 compared to the more perfect sawtooth shown in dotted lines. This rounding off therefore tends to reduce the rate of beam movement at the extremities of beam scansion, as described in the above-referenced U. S. Patent 2,440,418 by S. I. Tourshou and so compensates for screen flatness.

The action of inductance 76 to achieve this improvement in beam distribution scanning linearity may be best discerned by curves Figure 3*g* and Figure 3*h*. Figure 3*g* represents the voltage appearing across the capacitor 62 due to that portion of the yoke sawtooth of current passing therethrough while the voltage appearing across capacitor 74, due to that portion of yoke current passing through it is shown by curve 3*h*. By properly relating the values of capacitor 62 to capacitor 74 in combination with the choice of inductance 76, the magnitudes of the two voltages in Figures 3*g* and 3*h* can be controlled. Since these voltages in fact appear in series with the anode circuit of the vacuum tube 38, as well as the damper diode 72, they will contribute in determining the waveform of the current passing through the yoke. The resulting voltage therefore appearing across the yoke 54 will be somewhat as shown in Figure 3*f* which can be seen to agree with the desirable yoke current characteristics as set forth in Figure 3*e*.

By varying the inductance 76, the phase and magnitude of the ripple-voltage appearing across the capacitors 62 and 74 can be changed relative to one another thereby permitting quite a versatile control over the scanning linearity produced by the circuit. Although varying the inductance 76 does provide a considerable control over the scanning linearity produced by the circuit, very little change in the actual amplitude of the deflection signal will generally follow the use of this control.

Therefore, according to the present invention there is connected in series with the deflection yoke 54 a variable resistance 67 which has the effect of controlling both the effective Q of the yoke circuit between terminals 58 and 70, as well as the division of deflection current between the damping diode 72 and the deflection yoke 54. In the circuit of Figure 1, the placement of the series resistance 67 is particularly advantageous in that experiment shows that the corrective waveform developed across the linearity control 76, as well as the magnitude of the "B" boost voltage appearing at terminal 110, are so effected by the varying of resistance 67 that the overall linearity of the deflection yoke current tends to remain substantially unchanged with wide variations of the resistance 67. In practice, it is found that a resistance value in the order of several hundred ohms or so is sufficient to produce ample width control for television receiver operation.

The utility of the present invention is in no way limited to the specific arrangement in Figure 1 and may find application to a variety of deflection circuit configurations. For example, in Figure 2, there is shown another television receiver arrangement comprising a receiver section 100, which may well include the well-known television receiving components such as an RF amplifier, an oscillator, a converter, an IF amplifier, a video demodulator; and a video amplifier. The overall arrangement of Figure 2, with the exception of the inclusion of the width control resistance 67 in accordance with the present invention, is substantially the same as that shown and described in the above-referenced copending U. S. patent application by S. I. Tourshou, Serial No. 90,612. Accordingly, the output of the video amplifier is indicated for connection to the grid of a kinescope such as 56 which is also shown in Figure 1 and duplicated in Figure 2 for sake of descriptive simplicity. The television receiving arrangement also includes a sync separator 104, whose output is applied to synchronize a horizontal deflection signal generator 106 and vertical deflection circuit 108. The output of the vertical deflection circuit is available at terminals X—X indicated for connection to the vertical deflection yoke X—X at 110. The horizontal deflection signal generator 106 may be compared to the deflection signal generator 10 of Figure 1, taken in combination with the cathode follower amplifier 20, so that the output vacuum tube 38 may be properly driven with a sawtooth of voltage. Again for the sake of simplicity, the circuit arrangement of Figure 1, as well as corresponding indexes, have been duplicated wherever possible in Figure 2. Examples of typical circuit arrangements applicable to the functions depicted by the various blocks of Figure 2 are given in an article entitled "Television Receivers" by Antony Wright appearing in the March 1947 issue of the RCA Review. Normal B+ operating potential for the various blocks is illustrated as being provided at 110, the B+ power supply connections themselves being indicated by darker lines.

As pointed out in the above-referenced copending U. S. patent application by S. I. Tourshou, Serial No. 90,612, it is oftentimes desirable in television receiver systems to supply a particular circuit with a higher operating potential than nominally supplied by the "B" power supply unit for the remainder of the associated circuits. For example, in Figure 2 it may perhaps be desirable to supply the vertical deflection circuit 108 with an increased B+ operating potential in order to achieve a sufficient deflection swing in the vertical yoke winding X—X. Of course, in Figure 1, terminal 110 of the storage capacitor 62 will evidence an increased positive potential due to the power recovery "B" boost action hereinabove described. However, the terminal 110, which is at the upper end of the deflection yoke winding 54, there also appears a rather high positive-going pulse during the retrace period as evidenced by Figure 3*d*. In order to satisfactorily apply the potential at terminal 110 to the vertical deflection circuit, it would then be necessary to accomplish substantial filtering of the voltage which calls for the use of an additional filter inductance and capacitance combination or a somewhat less expensive RC type of filter. Although considerably more economical, the RC filter would have the disadvantage of expressing a much higher terminal impedance to the vertical deflection circuit which in some instances would prohibit its use.

According to Figure 2, the basic "B" boost action of Figure 1 is preserved, but is rearranged so that the actual boosted "B" voltage appears at the lower end of the deflection yoke 54 and therefore does not include the higher potential positive-going flyback or retrace pulse. This can be seen by noting that in Figure 2, the primary 64 of the autotransformer 66 is directly connected to the terminal 58 of the deflection winding 54 while the counter parts of capacitance 74, inductance 76, and storage capacitor 62 are respectively at 74′, 76′ and 62 in Figure 2. Nominal "B" power supply potential for the operation of the deflection circuit is applied at terminal 112 of the inductance 76 whereas the "B" boost voltage appears at terminal 114 of storage capacitor 62. Since a parabolic voltage, such as shown in Figures 3*g* and 3*h* are respectively developed across capacitors 62′ and 74′, with the variable inductance 76′ connected therebetween, the same type of linearity control action will be obtained as in Figure 1. Inasmuch as the voltage appearing at terminal 114, although not containing the high amplitude flyback pulse of Figure 3, does contain a small amount of ripple voltage, it should be filtered to some extent such as by a relatively low impedance RC network comprising resistor 116 and capacitor 117. The voltage then appearing across capacitor 117 will be substantially equal to the boosted voltage $E_b$ illustrated at Figure 3*d*. This may be applied directly to the vertical deflection circuit 108 as shown.

According to the present invention, the inclusion of the variable width control resistance 67 between the lower end of the yoke Y—Y and the right-hand terminal of the capacitor 74′ allows a considerable change to be effected in the amplitude of the developed deflection signal without producing excessive variations in the value of the developed "B" boost voltage. Thus, as is most valuable in circuits of this kind, width control of the television raster will not produce deleterious changes in the circuit voltage applied to the vertical deflection circuit 108 and cause corresponding changes in the height of the television raster. Furthermore, as was also the case of Figure 1, the changes in the current division between the yoke and the damper diode 72 as produced by the width control resistor of the present invention do not cause sufficient change in the developed kinescope accelerating potential to require refocussing of the electron beam.

It is further well to note that although the width control resistance 67 represents a circuit loss, the relatively high efficiency of the deflection circuit, with which the present invention has herein been exemplarily embodied for purposes of illustration, tends to swamp out this loss. Thus, the magnetic energy recovered from the pulse step-up transformer primary inductance may be thought of as partially compensating for the losses in the deflection yoke 54 as well as the width control resistance 67. In this respect, it is important to remember that the effective Q of the yoke 54, as far as the damper circuit to yoke circuit impedance ratio is concerned, includes the effect of the width control resistance 67 so that design considerations leading to optimum circuit operation should include the average or mean resistance of the width control 67.

It is to be understood that the successful utilization and value of the present invention is in no way limited by the theory and mode of operation expressed relative to the particular deflection circuit set forth herein. As pointed out hereinbefore, the series resistance type width control of the present invention may find application in numerous other types of deflection circuits and need not be constrained to use only in direct-drive type deflection circuits and/or deflection circuits yielding a high unidirectional potential for use as cathode ray beam accelerating potential.

Having thus described the invention, what I claim is:

1. In an electromagnetic cathode ray deflection system employing a deflection yoke having an input winding, the combination of a deflection signal supply terminal, a deflection output tube having at least an anode, cathode and control electrode, a power supply terminal for biasing said output tube anode, means coupling said deflection signal supply terminal with said output tube, a capacitor, connections for placing said capacitor in series combination with said yoke input winding between said discharge tube anode and said positive power supply terminal, a damping device connected in shunt with the series combination of said capacitor and yoke winding, and a variable resistance connected in series with the series combination of said yoke winding and said capacitor in its shunt connection with said damping device for controlling the amplitude of deflection produced by said deflection yoke.

2. In an electromagnetic cathode ray deflection system employing a deflection yoke having an input winding the combination of a deflection driving signal supply terminal, an output discharge tube having at least an anode, cathode and control electrode, an input circuit to said output tube between said control electrode and said cathode, means coupling said driving signal supply terminal with the discharge tube input circuit, a capacitor, a variable resistance element, connections for placing said deflection yoke winding in series with said capacitor and said variable resistance element to form a series combination, a power supply terminal for biasing said discharge tube anode positively with respect to said cathode, connections placing said series combination between said discharge tube anode and said power supply terminal, and a unilaterally conductive damping device connected in shunt with said series combination whereby the amplitude of deflection current through said yoke winding may be adjusted without deleteriously affecting the current wave form through said yoke winding by varying said resistance element.

3. In an electromagnetic cathode ray deflection system employing a deflection yoke having an input winding, the combination of a deflection driving signal supply terminal, an output discharge tube having at least an anode, cathode and control electrode, an input circuit to said output tube between said control electrode and said cathode, means coupling said driving signal supply terminal with the discharge tube input circuit, a capacitor, a variable resistance element, connections for placing said deflection yoke winding in series with said capacitor and said variable resistance element to form a series combination, a unilaterally conductive damping device connected in shunt with said series combination, a variable inductance and another capacitor connected in series to form a combination, connections placing said inductance-capacitor combination in shunt with said first named capacitor, a circuit path from the damping device extremity of said yoke winding and said discharge tube anode, and a circuit path from said variable inductance to said power supply terminal.

4. Apparatus according to claim 3 wherein said unilaterally conductive damping device is a discharge tube having an anode and cathode and wherein said damping device cathode is connected with the output tube anode extremity of said deflection yoke while said damping device anode is connected with the output tube anode extremity of said variable inductance.

5. In an electrical circuit having a first and second power supply terminals, a first and second inductance galvanically connected in series with one another to form an inductance combination whose respective extremities define a first and second input terminals, a switch having an inherent open circuit shunt capacitance, connections placing said switch in series with said inductance combination and between one power supply terminal and the first input terminal of said inductance combination, a variable resistance element, a storage capacitance, connections placing said resistance and capacitance in series between the second terminal of said inductance combination and the other power supply terminal, a unilaterally conductive damping device connected in shunt with the combination of said second inductance, said storage capacitance and said resistance, and means to open and close said switch.

6. In an electrical circuit having a positive and negative power supply terminals, a first and second inductance galvanically connected in series with one another to form an inductance combination whose respective extremities define a first and second input terminals, a switch having an inherent open circuit shunt capacitance, connections placing said switch in series with said inductance combination and between the negative power supply terminal and the first input terminal of said inductance combination, a variable resistance element, a storage capacitance, connections placing said resistance and capacitance in series between the second terminal of said inductance combination to the positive power supply terminal, a damping device having an anode and a cathode, a connection from said positive power supply terminal and said damping device anode, a connection from the junction of said first and second inductances to the damping device cathode, and means to open and close said switch.

7. Apparatus according to claim 6 where there is inserted, in series with the connection between said damping device anode and said source of positive potential, a third inductance, and where there is provided another capacitance connected between the anode of said damping device and the second input terminal of said inductance combination.

8. In an electromagnetic cathode ray deflection system of the direct drive type which employs a deflection yoke having substantially all of its deflection winding connected in the anode-cathode circuit of an output amplifier, the combination of, a storage capacitor and variable resistance in series combination connected in series with the deflection winding in said amplifier anode-cathode circuit, and an electrical damping element connected in shunt with the series combination formed by said storage capacitor, said variable resistance and the entire portion of said deflection winding included in the anode-cathode circuit of the output amplifier.

9. Apparatus according to claim 8 wherein there is provided a low-pass filter connected in shunt with said storage capacitor, said low-pass filter having a direct current conducting portion and wherein said damping device is connected in series with the low-pass direct current conductive portion in the shunt connection of said damping device across the series combination of said storage capacitor and deflection winding.

10. In an electromagnetic cathode ray deflection system of the direct drive type which employs an electromagnetic deflection yoke having its output terminals thereon defining the extremities of a single coordinate deflection winding, the combination of, an output amplifier having an anode and cathode, said output amplifier inherently exhibiting a predetermined output capacitance, an inductance, a storage capacitor, a variable resistance, a source of anode polarizing potential, connections placing said inductance, said capacitance, said resistance and the output terminals of said deflection yoke winding in series between the anode of said amplifier and said source of polarizing potential, and a damping device connected in shunt across the series combination formed by said storage capacitor, said deflection yoke output terminals and said variable resistance.

11. Apparatus according to claim 10 wherein there is imposed across said storage capacitor and in series with the damping device connection a low-pass filter.

12. In an electromagnetic cathode ray deflection system of the direct drive type which employs a deflection yoke having two utilization terminals for energizing the complete yoke deflection winding, said deflection yoke utilization terminals being serially connected in the anode-cathode circuit of an output amplifier, the combination of, a first capacitor and a variable resistance connected in series with said deflection coil terminals in the output amplifier anode-cathode circuit, an inductance and second capacitor connected in series with one another to form a combination, connections placing said inductance and capacitor combination in shunt with a portion of the amplifier anode-cathode circuit which includes said first capacitor, and a unilaterally conductive damping device connected in shunt through at least a portion of said inductance and said variable resistance with a portion of said output amplifier anode-cathode circuit.

13. In a cathode ray beam deflection and accelerating potential generating system of the type employing an electron discharge tube having directly connected in its anode-cathode circuit the series combination of a pulse step-up transformer primary winding and a cathode ray beam deflection yoke, the yoke having a first and second total axial winding utilization terminals and the electrical impedance of said primary winding being such that an undesirably excessive unidirectional voltage drop is produced across said winding thereby tending to reduce the active anode-cathode biasing potential of the electron discharge tube, a power recovery unidirectional potential boosting arrangement comprising in combination: a storage capacitor serially connecting the primary of said pulse step-up transformer with the first terminal of said deflection yoke, a variable resistor connected with the second terminal of said yoke, an inductance and a capacitance connected in series to form a wave-shaping network, connections placing said wave-shaping network in shunt with said storage capacitor, a unilaterally conductive damping device having an anode and a cathode, a connection from said damping device anode through said inductance to the step-up transformer primary winding side of said storage capacitor, and a connection through said variable resistor from said damping device cathode to the second terminal of said deflection yoke.

14. In a cathode ray beam deflection signal and beam accelerating potential generating system of the type employing an electron discharge tube having directly connected in its anode-cathode circuit a series combination of a pulse step-up transformer primary winding and an entire single axis winding of a cathode ray beam deflection yoke such that an inherent operational unidirectional voltage drop is produced across the pulse step-up transformer primary winding thereby tending to reduce the active anode-cathode biasing potential of the electron discharge tube, a power recovery unidirectional potential boosting arrangement comprising in combination: connections placing said pulse step-up transformer primary winding in series with the discharge tube anode side of the deflection yoke winding, a storage capacitor and variable resistance connected in series with the discharge tube cathode side of the deflection winding, a low-pass filter circuit having predetermined frequency characteristics connected in shunt with said storage capacitor, said low-pass filter having a portion thereof conductive to direct current, a unilaterally conductive damping device connected to form a series combination with the direct current conductive portion of said low-pass filter, and connections placing said series combination in shunt with the series connection of the storage capacitor, said variable resistance and the total single axis deflection yoke winding such that the terminal voltage of said storage capacitor tends to compensate for the unidirectional voltage drop across said pulse step-up transformer primary winding.

15. Apparatus according to claim 14 wherein there is additionally provided means for varying the frequency response characteristics of said low-pass filter circuit whereby the current waveform through said deflection yoke may be adjusted.

16. Apparatus according to claim 14 wherein said low-pass filter comprises the series combination of an inductance and capacitance, the inductance portion thereof constituting at least in part the direct current conductive portion of said low-pass filter.

17. Apparatus according to claim 14 wherein there is additionally provided a second low-pass filter connected between the deflection yoke winding side of said storage capacitor and a power utilization means.

BETHEL E. DENTON.

REFERENCES CITED

The following references are of record in the file of this patent:

UNITED STATES PATENTS

| Number | Name | Date |
|---|---|---|
| 2,223,990 | Holmes | Dec. 3, 1940 |
| 2,470,197 | Torsch | May 17, 1949 |
| 2,473,983 | Wolf | June 21, 1949 |